(12) United States Patent
Fox et al.

(10) Patent No.: US 8,527,160 B2
(45) Date of Patent: Sep. 3, 2013

(54) CONTROL SYSTEM AND METHOD FOR AUTOMATIC SELECTION OF A LOW RANGE GEAR RATIO FOR A VEHICLE DRIVETRAIN

(75) Inventors: Andrew J. Fox, Powell, OH (US); Michael Thomas Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 12/847,673

(22) Filed: Jul. 30, 2010

(65) Prior Publication Data

US 2011/0196584 A1 Aug. 11, 2011

Related U.S. Application Data

(60) Provisional application No. 61/301,872, filed on Feb. 5, 2010.

(51) Int. Cl.
  *G06F 7/00* (2006.01)
  *G06F 17/00* (2006.01)
  *G06F 19/00* (2011.01)

(52) U.S. Cl.
  USPC .......................................... 701/51; 74/336 R

(58) Field of Classification Search
  USPC .......................................... 701/51; 74/336 R
  See application file for complete search history.

(56) References Cited

U.S. PATENT DOCUMENTS

| | | |
|---|---|---|
| 2,730,914 A | 1/1956 | Rockwell |
| 4,601,359 A | 7/1986 | Weismann et al. |
| 4,630,704 A | 12/1986 | Yamakawa et al. |
| 4,768,609 A | 9/1988 | Taga et al. |
| 4,955,848 A | 9/1990 | Kotajima |
| 4,974,473 A | 12/1990 | Hatakeyama |
| 5,020,626 A | 6/1991 | Kodama |
| 5,054,335 A | 10/1991 | Andrews |
| 5,056,614 A | 10/1991 | Tokushima et al. |
| 5,058,700 A | 10/1991 | Shibahata |
| 5,119,900 A | 6/1992 | Watanabe et al. |
| 5,135,071 A | 8/1992 | Shibahata et al. |
| 5,141,072 A | 8/1992 | Shibahata |
| 5,353,889 A | 10/1994 | Hamada |
| 5,411,110 A | 5/1995 | Wilson et al. |
| 5,456,641 A | 10/1995 | Sawase |
| 5,669,850 A * | 9/1997 | Dourra et al. ............... 477/108 |
| 5,728,022 A | 3/1998 | Schultz |

(Continued)

FOREIGN PATENT DOCUMENTS

| | | |
|---|---|---|
| DE | 4409224 A1 | 10/1994 |
| WO | 2008/016537 A2 | 2/2008 |

*Primary Examiner* — Mary Cheung
*Assistant Examiner* — Frederick Brushaber
(74) *Attorney, Agent, or Firm* — Kenealy Vaidya LLP

(57) ABSTRACT

An apparatus and method for automatically controlling a drivetrain coupled to at least one drive wheel of a vehicle can include providing a first assembly including a low range drive ratio and a high range drive ratio. An electronic control unit can be configured to receive information from at least one sensor located on the vehicle and to provide an output signal based on the information. An actuator mechanism can be provided and configured to cause the first assembly to operate at a selected one of the low range drive ratio and the high range drive ratio based on instructions from the control unit. Separate algorithms can be provided to determine when to actuate from the high range drive ratio to the low range drive ratio and vice versa.

32 Claims, 5 Drawing Sheets

(56) References Cited

U.S. PATENT DOCUMENTS

| | | |
|---|---|---|
| 5,924,952 A | 7/1999 | Bowen |
| 5,989,146 A | 11/1999 | Brown et al. |
| 6,042,504 A | 3/2000 | Gualtieri et al. |
| 6,056,666 A | 5/2000 | Williams |
| 6,064,934 A | 5/2000 | Zhang |
| 6,086,515 A | 7/2000 | Buschmann et al. |
| 6,095,276 A | 8/2000 | Kuroda et al. |
| 6,105,703 A | 8/2000 | Kuroda et al. |
| 6,213,242 B1 | 4/2001 | Rodrigues et al. |
| 6,251,045 B1 | 6/2001 | Oliveira et al. |
| 6,257,082 B1 * | 7/2001 | Ore .................. 74/336 R |
| 6,520,040 B2 * | 2/2003 | Cox .................. 74/336 R |
| 6,549,840 B1 | 4/2003 | Mikami et al. |
| 6,579,208 B2 | 6/2003 | Oliveira et al. |
| 6,697,725 B1 | 2/2004 | Williams |
| 6,699,151 B2 | 3/2004 | Grogg et al. |
| 6,725,989 B1 | 4/2004 | Krisher et al. |
| 6,814,682 B2 | 11/2004 | Spitale |
| 6,817,434 B1 | 11/2004 | Sweet |
| 6,848,555 B2 | 2/2005 | Sakata et al. |
| 6,942,592 B1 | 9/2005 | Haka |
| 7,004,874 B2 | 2/2006 | Mizon et al. |
| 7,021,445 B2 | 4/2006 | Brissenden et al. |
| 7,062,984 B2 | 6/2006 | Haka |
| 7,086,987 B2 | 8/2006 | Janson et al. |
| 7,136,735 B2 | 11/2006 | Carlson et al. |
| 7,217,209 B2 | 5/2007 | Saito et al. |
| 7,343,998 B2 | 3/2008 | Morin et al. |
| 7,349,776 B2 | 3/2008 | Spillane et al. |
| 7,442,148 B2 | 10/2008 | Eckle et al. |
| 7,455,134 B2 | 11/2008 | Severinsky et al. |
| 7,458,917 B2 | 12/2008 | Yoshikawa et al. |
| 7,549,497 B2 | 6/2009 | Homan et al. |
| 7,678,003 B2 | 3/2010 | Janson et al. |
| 2002/0155916 A1 | 10/2002 | Brown et al. |
| 2003/0211913 A1 | 11/2003 | Spitale |
| 2004/0029673 A1 | 2/2004 | Lipman |
| 2004/0099459 A1 | 5/2004 | Nakasako et al. |
| 2005/0004732 A1 | 1/2005 | Berry et al. |
| 2006/0111823 A1 | 5/2006 | Tamai |
| 2007/0010927 A1 | 1/2007 | Rowley et al. |
| 2007/0016351 A1 * | 1/2007 | Allen et al. ............ 701/51 |
| 2007/0049451 A1 | 3/2007 | Mizon et al. |
| 2007/0093347 A1 | 4/2007 | Janson et al. |
| 2007/0096557 A1 | 5/2007 | Tamai et al. |
| 2007/0219695 A1 | 9/2007 | Chiu et al. |
| 2007/0281823 A1 | 12/2007 | Hun |
| 2007/0299581 A1 | 12/2007 | Torralbo et al. |
| 2008/0046158 A1 | 2/2008 | Carey et al. |
| 2009/0032359 A1 | 2/2009 | Asano |
| 2009/0032360 A1 | 2/2009 | Asano |
| 2009/0099762 A1 | 4/2009 | Heinzmann et al. |

\* cited by examiner

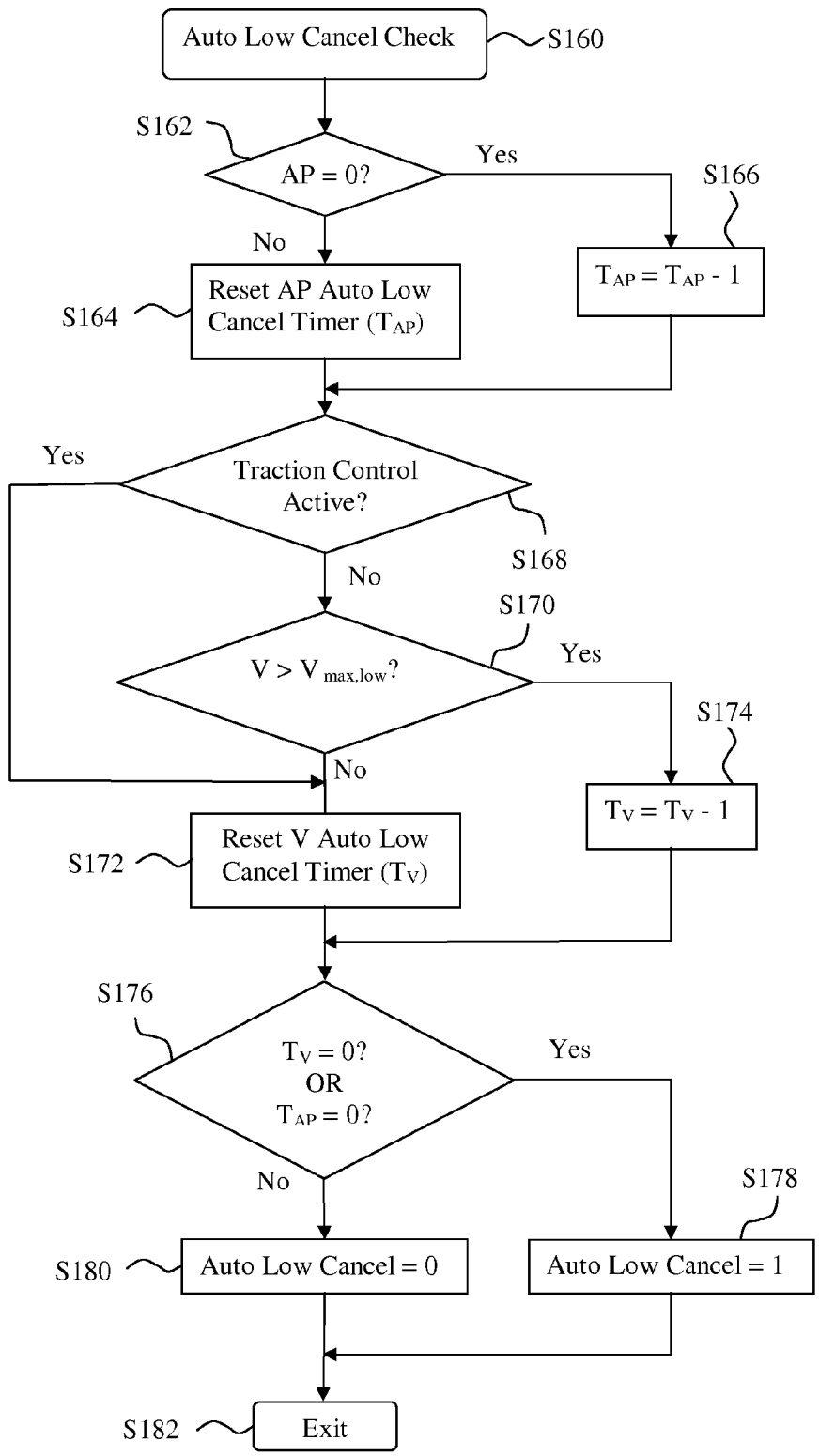

CONTROL SYSTEM AND METHOD FOR AUTOMATIC SELECTION OF A LOW RANGE GEAR RATIO FOR A VEHICLE DRIVETRAIN

CROSS REFERENCE TO RELATED APPLICATIONS

This application claims priority under 35 U.S.C. 119(e) to U.S. Provisional Application No. 61/301,872 filed on Feb. 5, 2010, the disclosure if which is also incorporated herein by reference.

BACKGROUND

1. Field

The presently disclosed subject matter relates to devices, systems, and processes useful as a control system for a gear reduction assembly, and in particular, for automatically selecting between a low range drive ratio and a high range drive ratio.

2. Description of the Related Art

Typical four-wheel drive vehicles have a transfer case that is a separate powertrain component from the engine and the multi-ratio transmission. The transfer case supplies the drive torque to each of the front and rear axles in series with the transmission. Shift-on-the-fly gear selection allows automatic selection between two-wheel drive and four-wheel drive while the vehicle is in motion. An electronic control unit (ECU) can select two or four-wheel drive based on several input variables, including road conditions, engine load, wheel slip, acceleration, driver input, and other variables.

The transfer case typically includes a gear reduction assembly that provides a high range drive ratio for normal driving speeds and a low range drive ratio for low driving speeds such as when the vehicle is driven off-road, when high torque is desired, when low traction surfaces exist, etc. For example, the low range drive ratio can be used when starting from a stop on an incline with a trailer in tow (i.e., when engine load is high). Each of the high range drive ratio and the low range drive ratio can be used with any one of the reverse drive ratio and the plurality of forward drive ratios available in the multi-ratio transmission.

In these known four-wheel drive configurations, selection of the low range drive ratio or the high range drive ratio is initiated by the driver. The driver can physically cause the shift by moving a shift lever mounted in the passenger compartment that is mechanically connected to the gearing in the transfer case. Movement of the lever by the vehicle driver engages the selected one of the low range drive ratio and the high range drive ratio.

Alternatively, the driver can initiate the shift between the low range drive ratio and the high range drive ratio by actuating an electrical switch in the driver area of the passenger compartment. The electrical switch signals an ECU that drives actuator(s) to shift between the low range drive ratio and the high range drive ratio.

In each of these driver-initiated configurations, the low range drive ratio will not be engaged until the driver takes a deliberate action. Thus, it is possible for the high range drive ratio to remain engaged when it might be otherwise prudent to engage the low range drive ratio. Similarly, the low range drive ratio may remain engaged long after it is necessary for given vehicle operation parameters. Thus, fuel economy, acceleration ability, and other vehicle performance can be compromised.

Accordingly, there is a need to provide a fully automated control of the selection of the low range drive ratio and the high range drive ratio without a specific prompt from the driver, as well as to provide operating parameters for an ECU that provide efficient and accurate automatic switching between the low range drive ratio and high range drive ratio.

SUMMARY

According to an aspect of the disclosed subject matter, a method for automatically controlling a drivetrain coupled to at least one drive wheel of a vehicle, the drivetrain including a first assembly including a low range drive ratio and a high range drive ratio, and a second assembly including a reverse drive ratio and a plurality of forward drive ratios is disclosed. The method can include providing an electronic control unit configured to receive information from at least one sensor located on the vehicle and to provide an output signal based on the information, and providing an actuator mechanism configured to cause the first assembly to operate at a selected one of the low range drive ratio and the high range drive ratio. The method can also include automatically causing the actuator mechanism to select one of the low range drive ratio and the high range drive ratio based on the output signal from the electronic control unit, and driving the at least one drive wheel at the selected one of the low range drive ratio and the high range drive ratio and simultaneously with one of the reverse drive ratio and a ratio of the plurality of forward drive ratios.

According to another aspect of the disclosed subject matter, a system for automatically controlling a two-speed gear reduction assembly in series with a multi-ratio transmission assembly of a vehicle, the two-speed gear reduction assembly including a low range drive ratio and a high range drive ratio, and the multi-ratio transmission assembly including a reverse drive ratio and a plurality of forward drive ratios, is disclosed. The system can include an actuator selectively movable between a low range position where the actuator couples the low range drive ratio in series with one of the reverse drive ratio and the plurality of forward drive ratios and a high range position where the actuator couples the high range drive ratio in series with the selected one of the reverse drive ratio and the plurality of forward drive ratios. The system can also include a vehicle speed sensor, a vehicle acceleration sensor, and a controller in electrical communication with each of the actuator, the vehicle speed sensor and the vehicle acceleration sensor. The controller can be configured to automatically select one of the low range drive ratio and the high range drive ratio based on electrical signals received from the vehicle speed sensor and the vehicle acceleration sensor. The controller can also be configured to automatically signal the actuator to move to a respective one of the low range position and the high range position when one of the low range drive ratio and the high range drive ratio is automatically selected.

According to another aspect of the disclosed subject matter, a method for automatically controlling a drivetrain assembly driving at least one wheel of a vehicle, the drivetrain including a two-speed gear reduction assembly in series with a multi-ratio transmission assembly, the two-speed drive assembly including a low range drive ratio and a high range drive ratio, and the multi-ratio transmission assembly including a reverse drive ratio and a plurality of forward drive ratios, is disclosed. The method can include providing a switch that can be manually shifted from an automatic position to a manual position and determining a position of the switch. The method can also include selecting the low range drive ratio when the position of the switch equals the manual position, comparing a vehicle speed with a maximum vehicle speed when the position of the switch is equal to the automatic position, comparing an accelerator pedal position to a minimum position when the vehicle speed is less than the maximum speed, comparing a vehicle acceleration to a maximum acceleration when the accelerator pedal position is greater than the minimum position, causing the drivetrain to operate in the low range drive ratio when the vehicle acceleration is less than the maximum acceleration, causing the drivetrain to operate in the high range drive ratio when the position of the switch is equal to the automatic position and when one of the vehicle speed is at least equal to the maximum speed, the accelerator pedal position is at most equal to the minimum position, and the vehicle acceleration is at least equal to the maximum acceleration, and driving the at least one wheel at the selected one of the low range drive ratio and the high range drive ratio and with one of the reverse drive ratio and the plurality of forward drive ratios.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 6 is a flowchart representative of a subroutine useable in the subroutine represented by the flowchart of FIG. 5.

DETAILED DESCRIPTION OF EXEMPLARY EMBODIMENTS

Figure 1:
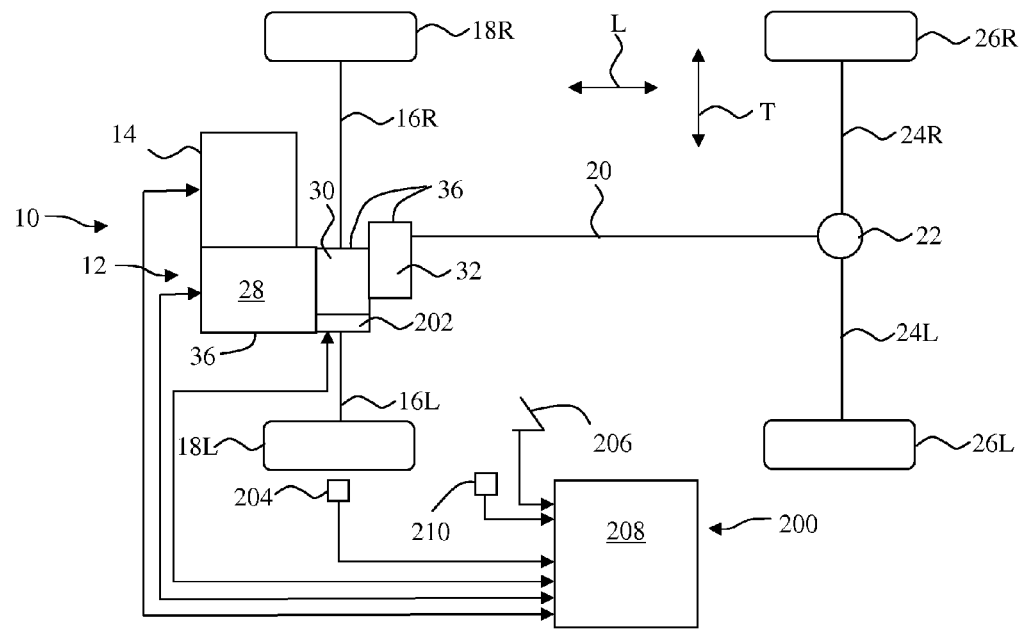
FIG. 1 is a schematic view of a first configuration of a powertrain and a control system of a vehicle made in accordance with principles of the disclosed subject matter.

FIG. 1 schematically represents a powertrain of a vehicle 10 that includes a control system 200 made in accordance with principles of the disclosed subject matter. The control system 200 can select the appropriate one of a low range drive ratio and a high range drive ratio without direct input from the driver of the vehicle. That is, the control system 200 can cause a shift between the low range drive ratio and the high range drive ratio without the driver of the vehicle moving a gear shift lever or pushing an electrical switch mounted in the driver area of the passenger compartment.

The vehicle 10 can include a power source, such as an internal combustion engine 14 and a drivetrain driven by the internal combustion engine 14. The drivetrain can be configured as a two-wheel drivetrain, a four-wheel drivetrain, or an all-wheel drivetrain and can include a transaxle 12, a pair of front driveshafts 16L, 16R, a pair of front wheels 18L, 18R, a propeller shaft 20, a rear differential assembly 22, a pair of rear driveshafts 24L, 24R, and a pair of rear wheels 26L, 26R.

Each of the driveshafts 16L, 16R, 24L, 24R can extend in a transverse direction (indicated by arrows T) of the vehicle 10. The rear driveshafts 24L, 24R can be spaced from the front driveshafts 16L, 16R in a longitudinal direction (indicated by arrows L) of the vehicle 10—which direction is perpendicular to the transverse direction T. Each of the front driveshafts 16L, 16R can be connected to and driven by the transaxle 12. Each of the rear driveshafts 24L, 24R can be connected to and driven by the rear differential 22.

The left front wheel 18L can be connected to and driven by the left front driveshaft 16L. The right front wheel 18R can be connected to and driven by the right front driveshaft 16R. The left rear wheel 26L can be connected to and driven by the left rear driveshaft 24L, and the right rear wheel 26R can be connected to and driven by the right rear driveshaft 24R.

Each of the internal combustion engine 14 and the transaxle 12 can be oriented with their output shafts (not shown) in the transverse direction T of the vehicle 10. However, this orientation can be varied without departing from the scope of the disclosed subject matter, and can include a perpendicular orientation between the engine output shaft and transaxle output shaft. The internal combustion engine 14 can be connected to the transaxle 12 to drive the transaxle 12 in a manner known in the art.

The propeller shaft 20 can extend in the longitudinal direction L of the vehicle 10 and can be connected to each of the transaxle 12 and the rear differential assembly 22. The propeller shaft 20 can be driven by the transaxle 12 and can drive the rear differential assembly 22.

The transaxle 12 can include a multi-ratio transmission 28, a two-speed final drive assembly 30 and a power take-off assembly 32. The transaxle 12 can be configured such that it is accommodated within the engine compartment (not shown) of the vehicle 10. Accordingly, the passenger compartment of the vehicle 10 need not accommodate the transaxle 12. Co-pending U.S. patent application Ser. No. 12/847,639, entitled "Transversely Mounted Transaxle Having A Low Range Gear Assembly and Powertrain for A Vehicle Including Same", filed concurrently herewith and incorporated herein by reference, discloses details of an exemplary embodiment of the transaxle 12.

The multi-ratio transmission 28 can be connected to and driven by the internal combustion engine 14 in a manner that is known in the art. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatic transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The two-speed final drive assembly 30 can be driven by the multi-ratio transmission 28 and can drive each of the front driveshafts 16L, 16R and the power take-off assembly 32 based on a selected one of a high range drive ratio and a low range drive ratio. Each of the high range drive ratio and the low range drive ratio can be selected independent of the ratio selected in the multi-ratio transmission 28. That is, the two-speed drive assembly 30 can provide the selected one of the high range drive ratio and the low range drive ratio in series with any one of the reverse ratio and the forward ratios selected in the multi-ratio transmission 28. The two-speed drive assembly 30 can include a high range gearing assembly that corresponds to the high range drive ratio and a low range gearing assembly that corresponds to the low range drive ratio. The high range gearing can be used for normal driving conditions, such as driving on a level surface, driving at highway speeds, driving on a dry road, etc. The low range gearing can be used for special driving conditions, such as driving on low traction surfaces, off-road driving, towing a trailer on an inclined surface at low speeds, starting from a stop with a trailer attached to the vehicle 10, etc. Selection of the high range gearing and the low range gearing can be performed automatically by the control system 200, as will be discussed in detail below.

Each of the low range gearing and the high range gearing can be provided by respective combinations of meshing gears, such as those disclosed in the above-referenced co-pending U.S. patent application Ser. No. 12/847,639, entitled "Transversely Mounted Transaxle Having A Low Range Gear Assembly and Powertrain for A Vehicle Including Same". However, other known combinations of meshing gears can be used to provide a respective one of the low range gearing and the high range gearing.

The transaxle 12 can include a housing 36 in which the multi-ratio transmission 28 and a front differential (not shown) for the front wheels 18R, 18L are mounted, as is known in the art. See, for example, U.S. Pat. No. 4,974,473, referenced above. The housing 36 can also contain the two-speed drive assembly 30 and the power take-off assembly 32.

The control system 200 can include an actuator 202, a vehicle speed sensor 204, an accelerator pedal position sensor 206 and an electronic control unit (ECU) 208 in electrical communication with each of the actuator 202, the vehicle speed sensor 204 and the accelerator pedal position sensor 206. Based on signals received from each of the sensors 204, 206, the ECU 208 can output a control signal to the actuator 202 to move the actuator 202 between a low range position where the actuator 202 couples the low range drive ratio in series with a selected one of the reverse drive ratio and the plurality of forward drive ratios and a high range position where the actuator 202 couples the high range drive ratio in series with the selected one of the reverse drive ratio and the plurality of forward drive ratios.

The actuator 202 can include any known actuator, such as an electrical actuator, a magnetic actuator, an electro-mechanical actuator, an electro-magnetic-mechanical actuator or an electro-hydraulic actuator. The actuator 202 can be coupled to a clutch (not shown) or other known torque transmission coupling device. The clutch can cause engagement of the selected one of the low range drive ratio and the high range drive ratio in series with selected one of the reverse drive ratio and the plurality of forward drive ratios. The actuator 202 can be a component of the two-speed final drive assembly 30 and at least the clutch can be mounted within the housing 36, as is disclosed in the above-referenced co-pending U.S. patent application Ser. No. 12/847,639, entitled "Transversely Mounted Transaxle Having A Low Range Gear Assembly and Powertrain for A Vehicle Including Same".

The vehicle speed sensor 204 can be a wheel speed sensor, a shaft speed sensor, or other known sensor capable of measuring data usable to determine the real-time travel speed of the vehicle. For example, the vehicle speed sensor 204 could be a sensor used to obtain data for a speedometer.

The accelerator pedal position sensor 206 can be any known sensor capable of measuring movement and/or the relative location of an accelerator pedal of the vehicle. For example, the accelerator pedal position sensor can be a sensor used in a vehicle drive-by-wire system that can control the speed of the internal combustion engine 14.

The ECU 208 can be referred to as a central processing unit (CPU) or as a controller. The ECU 208 can be dedicated to the two-speed final drive assembly 30. Alternatively, the ECU 208 can control the multi-ratio transmission 28 and/or the internal combustion engine 14 in addition to the two-speed final drive assembly 30. If the ECU 208 is dedicated to the two-speed final drive assembly 30, then the ECU 208 can be in electrical communication with an ECU(s) for the internal combustion engine and/or the multi-ratio-transmission.

The control system 200 can further include a manual override switch 210 in electrical communication with the ECU 208. The manual override switch 210 can enable the driver to disable automatic control of the actuator 202 by the ECU 208 and cause the actuator 202 to move to the low range position and engage the low range drive ratio. In addition, the override switch 210 can include another position that overrides the ECU 208 and causes the actuator 202 to move to the high range position and engage the high range drive ratio (thus, permitting the drivetrain to operate in the low range drive ratio only when either manually actuated by the override switch 210 or automatically actuated when the override switch 210 is placed back to the automatic position).

The ECU 208 can be configured with hardware alone, or to run software, that permits the ECU 208 to receive, store and process data from the sensors. The ECU 208 can be configured with hardware alone, or to run software, that calculates the real-time vehicle acceleration based on real-time vehicle speed data provided to the ECU 208 by the vehicle speed sensor 204. Alternatively, the vehicle speed sensor 204 could be a smart sensor configured with hardware alone, or to run software, that calculates the real-time vehicle acceleration and outputs the acceleration data to the ECU 208.

Figure 2:
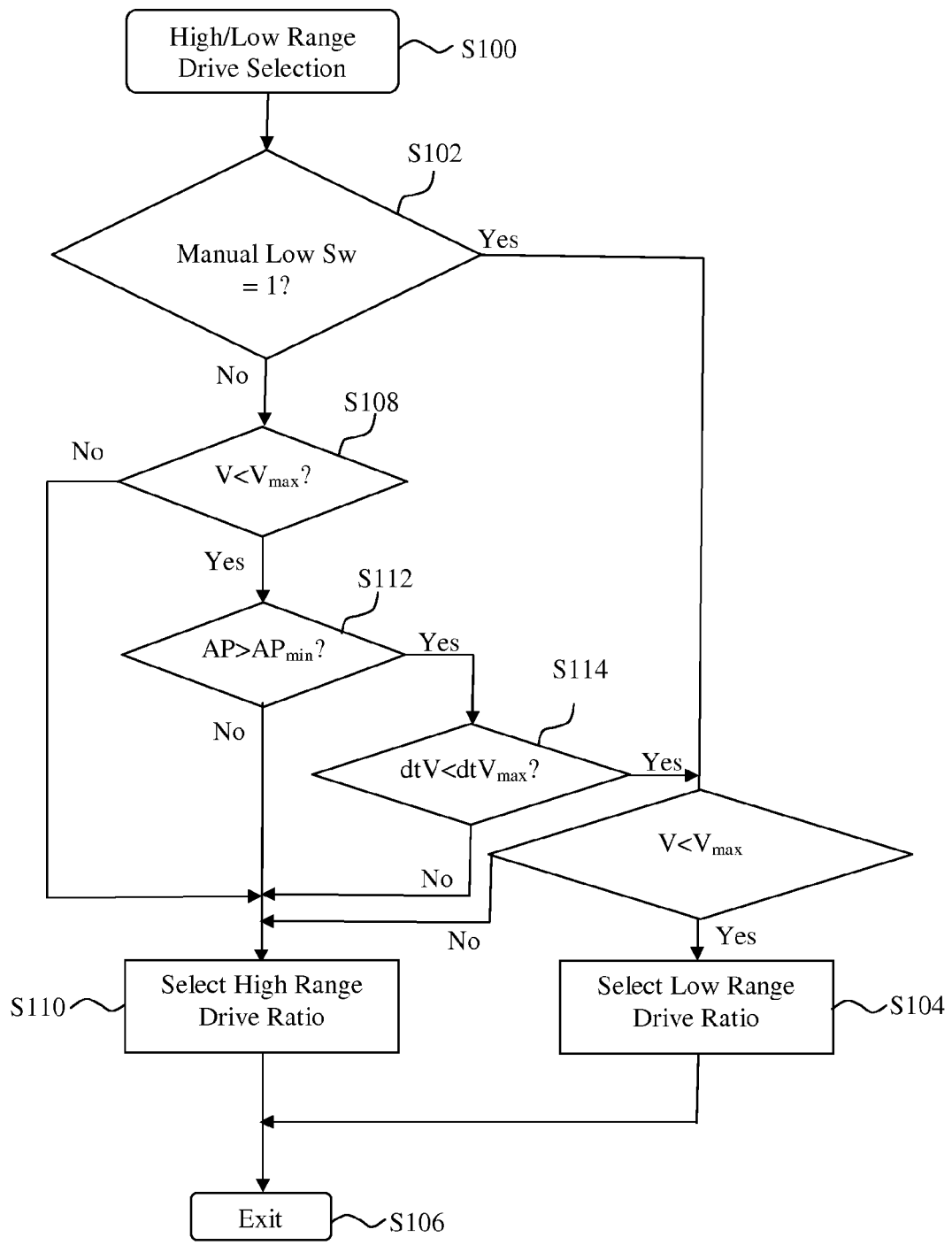
FIG. 2 is a flowchart representing a first embodiment of an algorithm useable by the control systems of FIGS. 1 and 3.

Although the exemplary embodiments depicted by FIGS. 1 and 2 can rely on vehicle speed, accelerator pedal position, and vehicle acceleration as inputs for the selection between the low range drive ratio and the high range drive ratio, other vehicle operation parameters can be used as inputs, such as torque converter slippage, longitudinal orientation of vehicle, lock up clutch actuation, etc. These other parameters can be used in addition to, or in place of, any combination of the vehicle speed, the accelerator pedal position, and the vehicle acceleration.

The ECU 208 can automatically select, without direct input from the driver, which one of the low range drive ratio and the high range drive ratio may be best suited for the given vehicle operation parameters. A subroutine built into the hardware or executed when running the software can be based on a flowchart illustrated in FIG. 2.

The subroutine can begin at step S100. At step S102, the ECU 208 can determine if the driver has by-passed the automatic selection of the low range drive ratio and the high range drive ratio via the manual override switch 210. That is, at step S102, the ECU 208 can determine if the driver has manually selected the low range drive ratio. In this exemplary embodiment, when the driver places the control system 200 into its manual mode by placing the manual override switch 210 in the ON position, the value of Manual Low Sw is equal to one (1). When the driver places the manual override switch 210 in the OFF position, the value of Manual Low Sw is equal to zero (0).

The value of Manual Low Sw can be assigned by the manual override switch 210 and sent to the ECU 208. That is, the manual override switch 210 can be configured with hardware and/or software to assign the value of Manual Low Sw based on the position (ON or OFF) of the manual override switch 210. Alternatively, the manual override switch 210 can provide raw data to the ECU 208 and the ECU 208 can be provided with hardware and/or software to process the raw data into the appropriate value for Manual Low Sw. Also, the manual override switch 210 can provide the value for Manual Low Sw with or without a prompt from the ECU 208. And, the value for Manual Low Sw can be stored in an electronic memory component external to or internal to at least one of the manual override switch 210 and the ECU 208 until needed by the ECU 208.

If the manual override switch 210 is placed in the ON position (i.e., the low range drive ratio is manually selected by the driver and the value of Manual Low Sw equals one (1)), then the subroutine can proceed to step S104. In step S104, the ECU 208 can select the low range drive ratio, in accordance with the driver's instruction. The ECU 208 then can proceed to step S106 of the subroutine where the subroutine can end or go on to further processing steps to determine whether the current selection of drive ratio is continually appropriate.

If the manual override switch 210 is activated by the driver, the ECU 208 can follow another subroutine where the ECU 208 can determine if it is not advantageous to permit manual engagement. Additionally, or alternatively, the ECU 208 can be configured to determine whether to disengage the low range drive ratio after it has been directly selected by the driver via the manual override switch 210.

The selection of the low range drive ratio can be carried to another subroutine where a decision can be made by the ECU 208 whether to signal the actuator 202 to move to the low range position. For example, the ECU 208 can be configured to collect data indicating the current position of the actuator 202 and comparing the current position to the position corresponding to the selection made at step S104. Alternatively, as part of step S104, the ECU 208 can signal the actuator 202 to move to the low range position, regardless of its current position.

Also, as part of step S104 or just prior to step S104 or subsequent to step S104, the ECU 208 can be configured to compare other vehicle parameters before signaling the actuator 202 to move to the low range position at step S104. Examples of these parameters can include any of, but are not limited to, engine output torque, engine intake air flow, fuel flow, transmission output torque, transmission output speed, transmission gear selection, input speed of the power-take-off assembly 32, output speed of the power-take-off assembly 32, status of torque distribution in the rear differential 22, position of an all-wheel-drive (AWD) manual switch or gear lever, vehicle inclination angle, vehicle load distribution, brake pedal position, and trailer detection signals. At any time, in the event that the ECU 208 determines an unsafe or undesired condition, a switch to low range (or back to high range) can be prevented by either the ECU 208 or by a mechanical limiting device or devices. The ECU 208 can work either alone or in combination with the mechanical limiting device(s) to prevent the transmission from switching between the low and high range positions.

If the ECU 208 determines at step S102 that the manual override switch 210 is not selected (i.e., placed in the OFF position and the value of Manual Low Sw equals zero (0)), then the control system 200 can operate in its automatic mode for selecting the appropriate one of the low range drive ratio and the high range drive ratio. And, the ECU 208 can proceed to step S108 of the subroutine. Step S108 can be useful for shift-on-the-fly capability for the control system 200.

At step S108, the ECU 208 can compare the data representing the real-time vehicle speed V provided by the vehicle speed sensor 204 with a maximum vehicle speed $V_{max}$. The vehicle speed sensor 204 can be configured with hardware and/or software to assign the value of the real-time vehicle speed V and send it to the ECU 208. Alternatively, the vehicle speed sensor 204 can send raw position data to the ECU 208 and the ECU 208 can be configured with hardware and/or software to process the raw data from the vehicle speed sensor 204 and assign the appropriate value to the real-time vehicle speed V based on this processing. Also, the vehicle speed sensor 204 can send the speed data to the ECU 208 without a prompt by the ECU 208 and the data can be stored in an electronic memory component internal to or external to at least one of the vehicle speed sensor 204 and the ECU 208 for access by the ECU 208, as needed. Alternatively, the vehicle speed sensor 204 can send the data only when prompted by the ECU 208.

The maximum vehicle speed $V_{max}$ can be set at a predetermined value that can provide an advantageous operation of the vehicle 10 (or vehicle 310 described below) in the low range drive ratio. The maximum vehicle speed $V_{max}$ can be stored in an electronic memory device external to or internal to the ECU 208 for access by the ECU 208, as needed.

If the real-time vehicle speed V is at least equal to the maximum vehicle speed $V_{max}$, then advantage(s) offered by the low range drive ratio may be diminished. Accordingly, the ECU 208 can proceed to step S110, where the high range drive ratio is selected. The ECU 208 can then proceed to step S106 of the subroutine where the subroutine ends (or can go to further control or monitoring processing steps).

As with the low range drive ratio selection, the selection of the high range drive ratio can be carried to another subroutine where a decision can be made whether to signal the actuator to move to the high range position. Alternatively, as part of step S110, the ECU 208 can signal the actuator 202 to move to the high range position, regardless of its current position.

Also, as part of step S110, or just prior to step S110, the ECU 208 can be configured to compare other vehicle parameters before signaling the actuator 202 to move to the high range position at step S110. Examples of these parameters can include any of, but are not limited to the examples discussed above with respect to step S104.

If the ECU 208 determines at step S108 that the real-time vehicle speed V is less than the maximum vehicle speed $V_{max}$, then the vehicle may be travelling at a speed for where an automatic shift to the low range drive ratio may be advantageous for the vehicle 10. The ECU 208 can then proceed to step S112.

At step S112, the ECU 208 can compare the data communicated by the accelerator pedal position sensor 206 (representing the real-time position AP of the accelerator pedal) to a minimum accelerator pedal position $AP_{min}$. For example, the accelerator pedal (not shown) can have a real-time position AP that falls between an idle position where the internal combustion engine 14 operates under a minimum consumption of fuel and air and produces a minimum power output, and a wide-open throttle position where the internal combustion engine 14 operates under a maximum consumption of fuel and air. In general, each incremental position of the accelerator pedal between the idle position and the wide-open throttle position corresponds to a specific torque/power output value for the internal combustion engine 14. The minimum accelerator position $AP_{min}$ can be selected from this range of accelerator positions that corresponds to a minimum torque/power output of the internal combustion engine 14 that can be advantageous in combination with the low range drive ratio. The minimum accelerator pedal position $AP_{min}$ can be stored in an electronic memory component external to or internal to the ECU 208 for access by the ECU 208, as needed.

Instead of measuring the real-time position AP of the accelerator pedal, the accelerator pedal position sensor 206 could measure the position of an engine throttle valve (not shown)

that is mechanically or electrically coupled to the accelerator pedal, as is known in the art. In this exemplary embodiment, the engine throttle valve can move between an idle position and a wide-open throttle position that correspond, respectively, to the torque/power outputs of the internal combustion engine 14 described above.

The accelerator pedal position sensor 206 can assign the value to the real-time position AP and can send this value to the ECU 208. Alternatively, the accelerator pedal position sensor 206 can send raw position data to the ECU 208 and the ECU 208 can be configured with hardware and/or software to process the raw data from the accelerator pedal position sensor 206 and assign the appropriate value to the real-time position AP based on this processing. Also, the accelerator pedal position sensor 206 can send the position data to the ECU 208 without a prompt by the ECU 208 and the data can be stored in an electronic memory component internal to or external to the ECU 208 until the ECU 208 reaches step S124. Alternatively, the accelerator pedal position sensor 206 can send the data only when prompted by the ECU 208. And, the value for the real-time position AP can be stored in an electronic memory component external to or internal to at least one of the ECU 208 and the accelerator pedal position sensor 206 for access by the ECU 208, as needed.

If the real-time position AP lies between the idle position and the minimum accelerator pedal position $AP_{min}$, then the load on the internal combustion engine 14 may not be sufficient to take full advantage of the low range drive ratio. Accordingly, the ECU 208 can then proceed to step S110 where the ECU 208 can select the high range drive ratio, as discussed above. The ECU 208 then can proceed to step S106 of the subroutine where the subroutine can end, as discussed above.

If the real-time position AP is greater than the minimum accelerator pedal position $AP_{min}$, then the load on the internal combustion engine 14 may be sufficient to take advantage of the utility of the low range drive ratio. Accordingly, the ECU 208 can proceed to step S114 of the subroutine.

At step S114, the ECU 208 can compare the real-time vehicle acceleration dtV with a maximum vehicle acceleration $dtV_{max}$. The maximum acceleration $dtV_{max}$ can be independent of the minimum accelerator pedal position $AP_{min}$ or the maximum acceleration $dtV_{max}$ can correspond to the minimum accelerator pedal position $AP_{min}$. This comparison can be useful to determine if the engine load suggested by the accelerator pedal position sensor 206 would benefit from the low range drive ratio. That is, if the real-time vehicle acceleration dtV is less than the maximum vehicle acceleration $dtV_{max}$ despite a real-time accelerator pedal position AP indicative of a high torque/power output for the internal combustion engine 14, then the low range drive ratio may be advantageous for the vehicle 10.

The real-time vehicle acceleration dtV can be provided by an acceleration sensor (not shown) in electrical communication with the ECU 208. The acceleration sensor can assign the value of the real-time vehicle acceleration dtV and can send the real-time vehicle acceleration dtV to the ECU 208. That is, the acceleration sensor can be configured with hardware and/or software to assign a value to the real-time vehicle acceleration dtV based on data sensed by the acceleration sensor. Alternatively, the acceleration sensor can provide raw data to the ECU 208 and the ECU 208 can be configured with hardware and/or software to process the raw data from the acceleration sensor and assign the appropriate value to the real-time vehicle acceleration dtV based on this processing. Also, the acceleration sensor can send the position data to the ECU 208 without a prompt by the ECU 208 and the data can be stored in an electronic memory component internal to or external to the ECU 208 until the ECU 208 reaches step S114. Alternatively, the acceleration sensor can send the data only when prompted by the ECU 208. And, the value for the real-time vehicle acceleration dtV can be stored in an electronic memory component external to or internal to at least one of the acceleration sensor and the ECU 208 for access by the ECU 208, as needed.

Alternatively, the real-time vehicle acceleration dtV can be calculated from sequential values of the real-time vehicle speed V. Either the vehicle speed sensor 204 or the ECU 208 can be configured with hardware and/or software to calculate the real-time vehicle acceleration dtV from the sequential values of the real-time vehicle speed V. The sequential values of the real-time vehicle speed can be stored in an electronic memory component external to or internal to either the vehicle speed sensor 204 or the ECU 208 for access by the appropriate one of the vehicle speed sensor 204 and the ECU 208, as needed.

The value of the maximum vehicle acceleration $dtV_{max}$ can be stored in an electronic memory component external to or internal to at least one of the acceleration sensor, the vehicle speed sensor 204, and the ECU 208 for access, as needed.

If at step S114 the ECU 208 determines that the real-time vehicle acceleration dtV is less than the maximum acceleration $dtV_{max}$, the ECU 208 can proceed to step S104 where the ECU selects the low range drive ratio, as discussed above. Then, the ECU 208 can proceed to step S106 of the subroutine where the subroutine can end, as discussed above.

If the ECU 208 determines at step S104 that the real-time vehicle acceleration is not less than the maximum acceleration $dtV_{max}$, then the ECU 208 can proceed to step S110 where the ECU 208 can select the high range drive ratio. Thus, the actual vehicle performance substantially corresponds to an expected performance and the high range drive ratio can provide the most advantageous drivetrain performance with respect to power output and fuel consumption.

Thus, steps S108, S112 and S114 can be beneficial for an automatic shift-on-the-fly capability of the control system 200.

Figure 3:
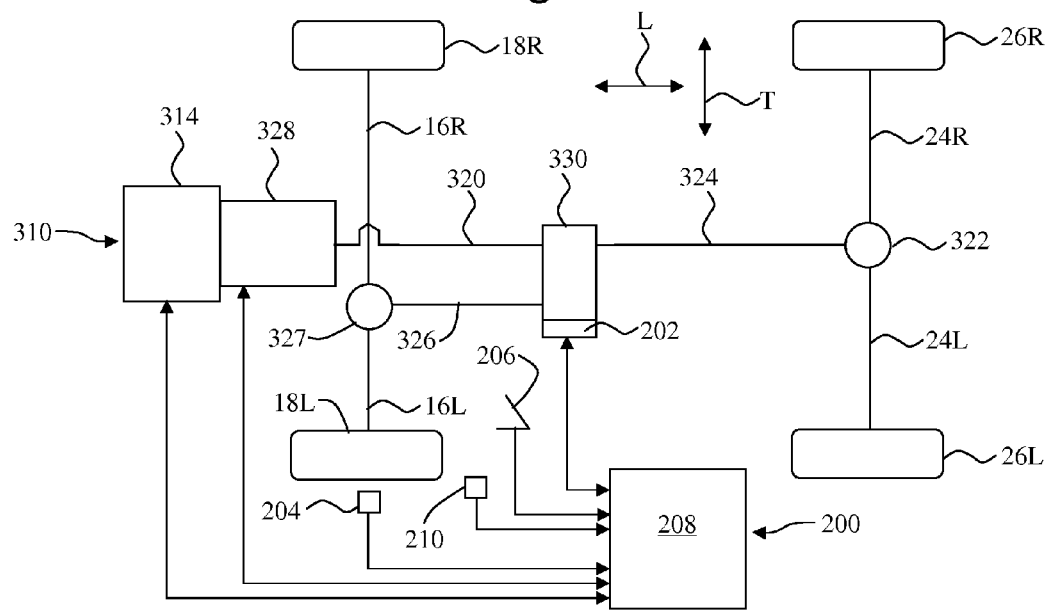
FIG. 3 is a schematic view of a second configuration of a powertrain and a control system of a vehicle made in accordance with principles of the disclosed subject matter.

FIG. 3 schematically represents another exemplary embodiment of a drivetrain of an automotive vehicle 310 that includes the control system 200 described above. Certain components of the vehicle 310 can be common with those of the vehicle 10 and are designated with like reference characters. The control system 200 of this embodiment of the vehicle 310 can implement the algorithm described above with reference to FIG. 2.

The vehicle 310 can be configured as a four-wheel drive vehicle or an all-wheel drive vehicle with a power source, such as an internal combustion engine 314, driving a four-wheel-drive-type drivetrain. The drivetrain can include a multi-ratio transmission 328 that has a reverse drive ratio and a plurality of discrete forward drive ratios that can be selected manually or automatically, as disclosed above. Similarly, the multi-ratio transmission 328 can be a continuously variable multi-ratio transmission, as described above. In contrast to the vehicle 10 depicted by FIG. 1, the internal combustion engine 314 and the multi-ratio transmission can be mounted along the longitudinal direction L of the vehicle 310.

The drivetrain can further include a pair of front driveshafts 16L, 16R, a pair of front wheels 18L, 18R, a primary propeller shaft 320, a rear propeller shaft 324, a front propeller shaft 326, a front differential assembly 327, a transfer case 330, a rear differential assembly 322, a pair of rear driveshafts 24L, 24R, and a pair of rear wheels 26L, 26R.

The transfer case 330 can be spaced along the longitudinal direction L from the multi-ratio transmission 328. The front propeller shaft 320 can connect the transfer case to the multi-ratio transmission 328 so that the multi-ratio transmission 328 can drive the transfer case 330. Each of the rear propeller shaft 324 and the front propeller shaft 326 can be coupled to and driven by the transfer case in a manner known in the art. The transfer case 300 can include a gear assembly (not shown) that can provide each of the low range drive ratio and the high range drive ratio in a manner known in the art.

The actuator 202 can be a component of the transfer case 330 and at least a portion of the actuator 202 can be mounted within the housing of the transfer case 330, as is disclosed in the above-referenced U.S. patent application Ser. No. 12/847,639, entitled "Transversely Mounted Transaxle Having A Low Range Gear Assembly and Powertrain for A Vehicle Including Same".

Figure 4:
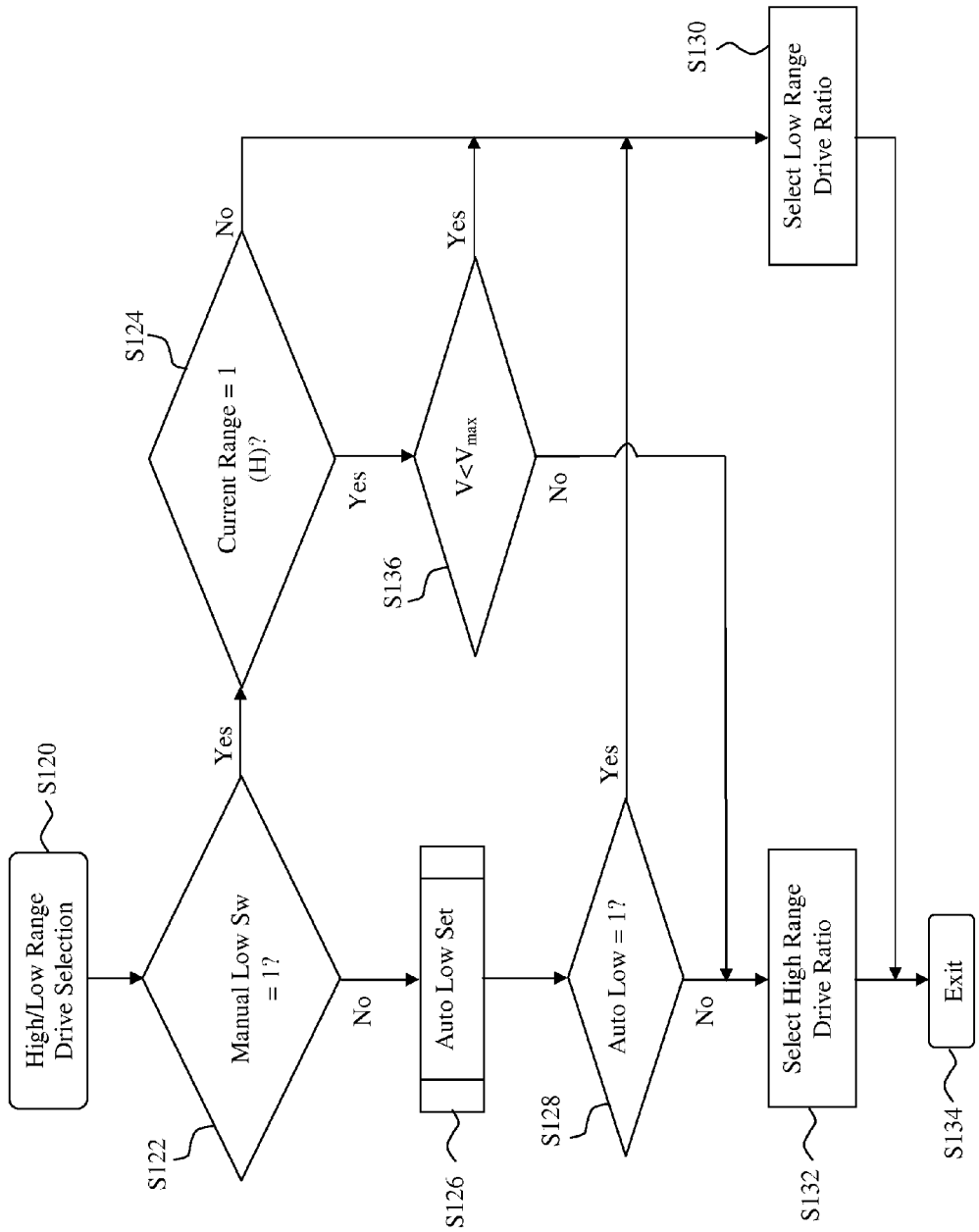
FIG. 4 is a flowchart representative of a second embodiment of an algorithm usable by the control systems of FIGS. 1 and 3.
Figure 5:
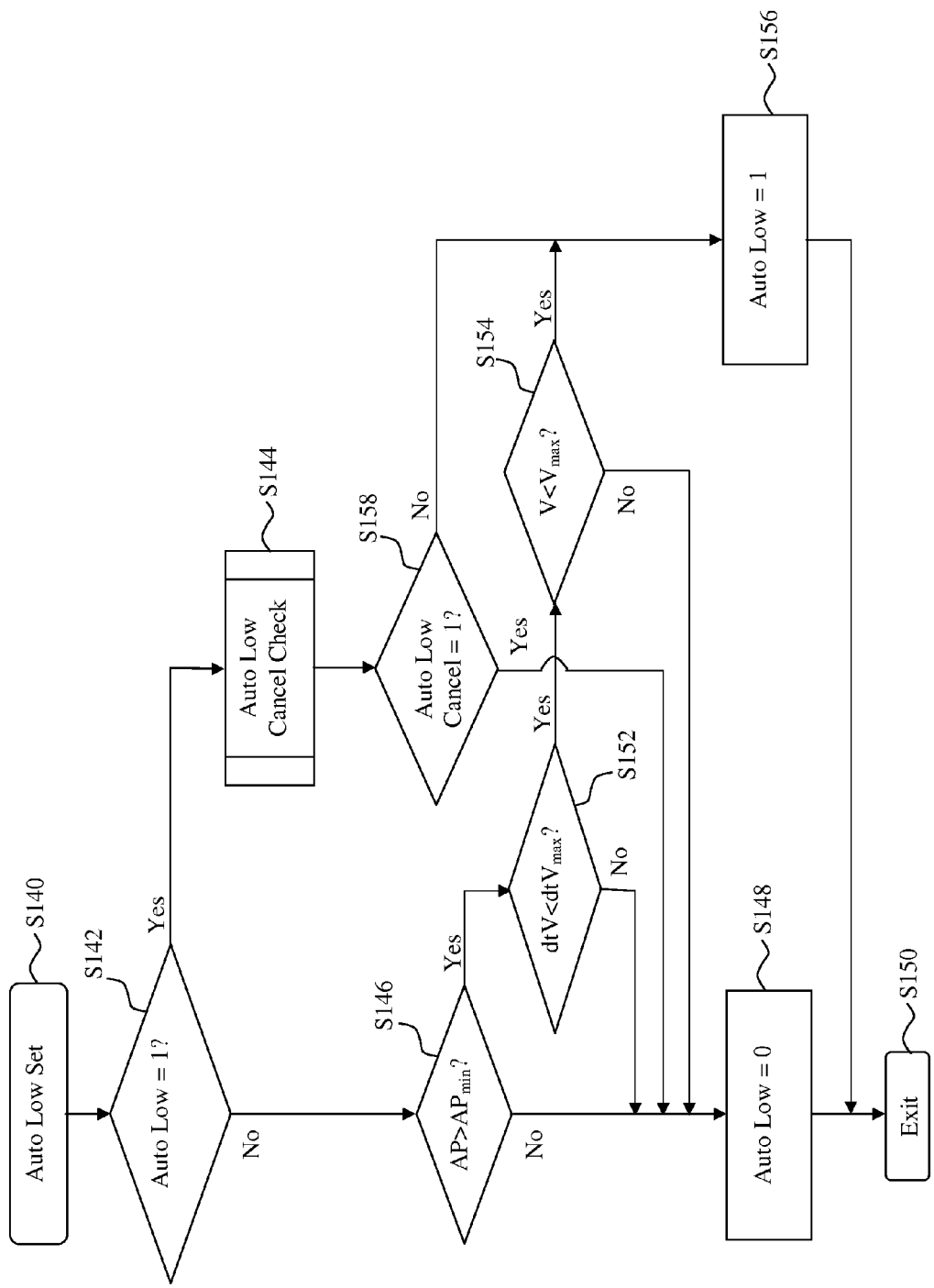
FIG. 5 is a flowchart representative of a subroutine useable in the algorithm represented by the flowchart of FIG. 4.

FIGS. 4-6 illustrate another embodiment of an algorithm in accordance with the presently disclosed subject matter. This alternate embodiment of the algorithm can be carried out in the control system 200 of FIG. 1 or FIG. 3. The flowchart of FIG. 4 represents a main subroutine that can be built into hardware of the ECU 208 of FIG. 1 or FIG. 3 or executed when the ECU 208 of FIG. 1 or FIG. 3 runs software.

The main subroutine can begin at step S120. At step S122, the ECU 208 can determine if the driver has by-passed the automatic selection of the low range drive ratio and the high range drive ratio via the manual override switch 210. That is, at step S122, the ECU 208 can determine if the driver has manually selected the low range drive ratio. In this exemplary embodiment, when the driver places the manual override switch 210 in the ON position, the value of Manual Low Sw can be equal to one (1). And, when the driver places the manual override switch 210 in the OFF position, the value of Manual Low Sw can be equal to zero (0).

The value of Manual Low Sw can be assigned by the manual override switch 210 and sent to the ECU 208. That is, the manual override switch 210 can be configured with hardware and/or software to assign the value Manual Low Sw based on the position (ON or OFF) of the manual override switch 210. Alternatively, the manual override switch 210 can provide raw data to the ECU 208 and the ECU 208 can be provided with hardware and/or software to process the raw data into the appropriate value for Manual Low Sw. Also, the manual override switch 210 can provide the value for Manual Low Sw with or without a prompt from the ECU 208. And, the value for Manual Low Sw can be stored in an electronic memory component external to or internal to at least one of the manual override switch 210 and the ECU 208 until needed by the ECU 208.

If the manual override switch 210 is placed in the ON position (i.e., the low range drive ratio is manually selected by the driver and the value of Manual Low Sw equals one (1)), then the ECU can proceed to step S124 of the main subroutine. Further details of this manual override function will be described later.

If the driver has placed the manual override switch 210 in the OFF position, then the ECU 208 can proceed to step S126 because the value for Manual Low Sw is not equal to one (1). The ECU 208 can begin the automatic mode for selecting the appropriate one of the low range drive ratio and the high range drive ratio at step S126. Step S126 represents a subroutine (the Auto Low Set subroutine) that the ECU 208 can follow to determine automatically whether the low range drive ratio is appropriate or whether the high range drive ratio is appropriate.

At step S126, the ECU 208 can assign a value of zero (0) or one (1) to Auto Low. If the ECU 208 has assigned the value of Auto Low to be equal to one (1), then the ECU 208 has determined in the Auto Low Set subroutine (i.e., step S126) that conditions may be favorable for selection of the low range drive ratio. If the ECU 208 has assigned the value of Auto Low to be equal to one (1), then the ECU 208 has determined in the Auto Low Set subroutine that conditions may not be favorable for selection of the low range drive ratio. Details of the Auto Low Set subroutine followed at step S126 will be discussed further with reference to FIG. 5.

After completing the Auto Low Set subroutine at step S126, the ECU can proceed to step S128. At step S128, the ECU 208 can compare the value of Auto Low assigned at step S126 with a predetermined value. In this exemplary embodiment, this predetermined value can be one (1). This predetermined value can be stored in an electronic memory component external to or internal to the ECU 208 for access by the ECU 208, as needed. If the ECU 208 determines that Auto Low equals one (1) at step S128, then the ECU can proceed to step S130. If the ECU 208 determines that Auto Low does not equal one (1) at step S128, then the ECU can proceed to step S132.

If the ECU 208 moves from step S128 to step S130, then the ECU 208 has determined that the low range drive ratio may be appropriate for the current vehicle conditions. At step S130, the ECU can select the low range drive ratio, in accordance with the automatic determination made by the ECU at step S126. This selection can involve the ECU 208 signaling the actuator 202 to move to the low range position. Alternatively, the signaling of the actuator 202 can be executed in a separate step or subroutine. For example, the ECU 208 can be configured to collect data indicating the current position of the actuator 202 and comparing the current position to the position corresponding to the selection made at step S130. Alternatively, as part of step S130, the ECU 208 can signal the actuator 202 to move to the low range position, regardless of its current position.

Also, as part of step S130 or just prior to step S130 or subsequent to step S130, the ECU 208 can be configured to compare other vehicle parameters before signaling the actuator 202 to move to the low range position at step S130. Examples of these parameters can include any of, but are not limited to, engine output torque, engine intake air flow, fuel flow, transmission output torque, transmission output speed, transmission gear selection, input speed of the power-take-off assembly 32, output speed of the power-take-off assembly 32, status of torque distribution in the rear differential 22, position of an AWD manual switch, vehicle inclination angle, vehicle load distribution, brake pedal position, and trailer detection signals.

The ECU 208 can then proceed to step S134 of the subroutine where the subroutine can end or go on to further processing steps to determine whether the current selection of the drive ratio is continually appropriate.

If the ECU 208 moves from step S128 to step S132, then the ECU 208 can select the high range drive ratio in accordance with the automatic determination made by the ECU 208 at step S126. This can involve the ECU 208 signaling the actuator 202 to move to the high range position. Alternatively, the signaling of the actuator 202 can be executed in a separate step or subroutine. For example, the ECU 208 can be configured to collect data indicating the current position of the actuator 202 and comparing the current position to the position corresponding to the selection made at step S132. Alternatively, as part of step S132, the ECU 208 can signal the actuator 202 to move to the low range position, regardless of its current position.

If the ECU 208 moves from step S122 to step S124, then the control system 200 is in the manual mode, in accordance with the driver's request. At step S124, the ECU 208 can determine whether the real-time position of the actuator 202 corresponds to the low range position or the high range position.

The real-time actuator position can be reflected by the value Current Range. In this exemplary embodiment, when the actuator 202 is in the low range position, the value of Current Range can be zero (0). And, when the actuator 202 is in the high range position, the value of Current Range can be one (1).

Prior to step S124, the ECU 208 can assign the value of Current Range based on the last value of actuator position. When the ignition switch (not shown) of the vehicle 10, 310 is turned on, the ECU 208 can either retrieve from an electronic memory component external to or internal to the ECU 208 the last saved value of the actuator position. Alternatively, when the ignition switch is turned on, the ECU 208 can be configured with hardware and/or software to signal the actuator 202 of FIG. 1 or FIG. 3 to move to the high range position. If the vehicle 10, 310 has been in operation and the ECU 208 has executed the subroutine of FIG. 4 at least once, then the ECU 208 can assign Current Range with a value that corresponds to the last actuator position selected by the ECU 208 in the subroutine of FIG. 4.

Alternately, the value of Current Range can be assigned by the actuator 202 and sent by the actuator 202 to the ECU 208. Alternatively, the actuator 202 can send raw position data to the ECU 208 and the ECU 208 can be configured with hardware and/or software to process the raw data from the actuator 202 and assign the appropriate value of zero (0) or one (1) to Current Range based on this processing. Also, the actuator 202 can send the position data to the ECU 208 without a prompt by the ECU 208 and the data can be stored in an electronic memory component internal to or external to the ECU 208 until the ECU 208 reaches step S124. Alternatively, the actuator 202 can send the data only when prompted by the ECU 208.

At step S124, the ECU 208 can compare the value of Current Range to a predetermined value in order to determine which one of the low range drive ratio and the high range drive ratio is currently engaged. This predetermined value can be stored in an electronic memory component external to or internal to the ECU 208. In this exemplary embodiment, the predetermined value can be equal to one (1). If the ECU 208 determines at step S124 that the value of Current Range is not equal to one (1), then the ECU can proceed to step S130. If the ECU 208 determines at step S124 that the value of Current Range is equal to one (1), then the ECU 208 can proceed to step S136.

If the ECU 208 moves to step S130 from step S124, then the current position of the actuator 202 corresponds to the low range position and the driver's request for the low range drive ratio is redundant to the real-time engagement of the low range drive ratio. When the ECU 208 moves to step S130, the ECU 208 can begin the process to signal the actuator 202 to remain in the low range position, as discussed above with respect to the automatic selection mode for the control system 200.

If the ECU 208 moves to step S136, then the current position of the actuator 202 corresponds to the high range position. At step S136, the ECU 208 can determine if the driver's manual request for a shift from the high range drive ratio to the low range drive ratio is appropriate based on the real-time vehicle speed V. The real-time vehicle speed V can be provided to the ECU 208 by the vehicle speed sensor 204 of FIG. 1 or FIG. 3. The vehicle speed sensor 204 can be configured with hardware and/or software to assign the value of the real-time vehicle speed V and send it to the ECU 208. Alternatively, the vehicle speed sensor 204 can send raw position data to the ECU 208 and the ECU 208 can be configured with hardware and/or software to process the raw data from the vehicle speed sensor 204 and assign the appropriate value to the real-time vehicle speed V based on this processing. Also, the vehicle speed sensor 204 can send the speed data to the ECU 208 without a prompt by the ECU 208 and the data can be stored in an electronic memory component internal to or external to at least one of the vehicle speed sensor 204 and the ECU 208 until the ECU 208 reaches step S138. Alternatively, the vehicle speed sensor 204 can send the data only when prompted by the ECU 208.

At step S136, the ECU 208 can compare the real-time vehicle speed V to a maximum speed value $V_{max}$. The maximum speed value $V_{max}$ can be a predetermined value that can provide an advantageous operation of the vehicle 10, 310 in the low range drive ratio. The maximum vehicle speed value $V_{max}$ can be stored in an electronic memory component external to or internal to the ECU 208 for access by the ECU 208, as needed.

If the ECU 208 determines at step S136 that the real-time vehicle speed V is less than the maximum speed value $V_{max}$, then a shift from the high range drive ratio to the low range drive ratio can be performed, in accordance with the driver's request. Then, the ECU 208 can proceed to step S130 where step S130 can be performed, as described above. Upon completion of step S130, the ECU can proceed to step S134 and perform step S134, as discussed above.

If the ECU 208 determines at step S136 that the real-time vehicle speed V is not less than the maximum speed value $V_{max}$, then advantage(s) offered by the low range drive ratio may be diminished. Accordingly, the ECU 208 can maintain the actuator 202 in the high range position. Then, the ECU 208 can proceed to step S132 where step S132 can be performed as described above. Upon completion of step S132, the ECU can proceed to step S134 and perform step S134 as discussed above.

As mentioned above, at step S126, the ECU 208 can follow a subroutine that can be used to automatically select the appropriate one of the low range drive ratio and the high range drive ratio when the manual override switch in turned off. This subroutine (Auto Low Set subroutine) is represented by the flowchart of FIG. 5 and can begin at step S140.

In the Auto Low Set subroutine, the ECU 208 can assign Auto Low with a value of zero (0) or one (1) based on real-time vehicle parameters. A value of zero (0) can represent a decision by the ECU 208 that conditions may not be favorable for the low range drive ratio. A value of one (1) can represent a decision by the ECU 208 that conditions may be favorable for the low range drive ratio.

After entering the Auto Low Set subroutine at step S140, the ECU can proceed to step S142. At step S142, the ECU can compare the last value of Auto Low with a predetermined value. The last value of Auto Low can correspond to the value assigned by the ECU 208 when the ECU 208 last ran the Auto Low Set subroutine. Alternatively, the last value of Auto Low can correspond to the position of the actuator 202 the vehicle ignition is turned off. The last value of Auto Low Set can be stored in an electronic memory component external to or internal to the ECU 208.

If the low range drive ratio was last selected by the ECU 208, then the last value of Auto Low can be equal to one (1) and the ECU 208 can proceed to step S144. At step S144, the ECU 208 can enter a subroutine (Auto Low Cancel Check subroutine) where the ECU can determine whether the current automatic engagement of the low range drive ratio should be maintained. Details of the Auto Low Cancel Check subroutine will be provided with the explanation of FIG. 6, below.

If the high range drive ratio was last selected, the value of Auto Low can be equal to zero (0). If the value of Auto Low equals zero (0), then the ECU 208 can proceed to step S146.

If the ECU 208 moves from step S142 to step S146, then the ECU 208 can begin the decision process to determine the appropriateness of an automatic shift from the high range drive ratio to the low range drive ratio.

At step S146, the ECU 208 can compare the real-time position AP of the accelerator pedal with a minimum accelerator pedal position $AP_{min}$. The accelerator pedal position sensor 206 can communicate the real-time position AP to the ECU 208. For example, the accelerator pedal (not shown) can have a real-time position AP that falls between an idle position where the internal combustion engine 14, 314 operates under a minimum consumption of fuel and air and produces a minimum power output, and a wide-open throttle position where the internal combustion engine 14, 314 operates under a maximum consumption of fuel and air. In general, each incremental position of the accelerator pedal between the idle position and the wide-open throttle position corresponds to a specific torque/power output value for the internal combustion engine 14, 314. The minimum accelerator position $AP_{min}$ can be selected from this range of accelerator positions that corresponds to a minimum torque/power output of the internal combustion engine 14, 314 that can be advantageous in combination with the low range drive ratio. The minimum accelerator pedal position $AP_{min}$ can be stored in an electronic memory component external to or internal to the ECU 208 for access by the ECU 208, as needed.

Instead of measuring the real-time position AP of the accelerator pedal, the accelerator pedal position sensor 206 could measure the position of an engine throttle valve (not shown) that is mechanically or electrically coupled to the accelerator pedal, as is known in the art. In this exemplary embodiment, the engine throttle valve can move between an idle position and a wide-open throttle position that correspond, respectively, to the torque/power outputs of the internal combustion engine 14, 314 described above.

The accelerator pedal position sensor 206 can assign the value to the real-time position AP and can send this value to the ECU 208. Alternatively, the accelerator pedal position sensor 206 can send raw position data to the ECU 208 and the ECU 208 can be configured with hardware and/or software to process the raw data from the accelerator pedal position sensor 206 and assign the appropriate value to the real-time position AP based on this processing. Also, the accelerator pedal position sensor 206 can send the position data to the ECU 208 without a prompt by the ECU 208 and the data can be stored in an electronic memory component internal to or external to at least one of the accelerator pedal position sensor 206 and the ECU 208 for access by the ECU 208, as needed. Alternatively, the accelerator pedal position sensor 206 can send the data only when prompted by the ECU 208. And, the value for the real-time position AP can be stored in an electronic memory component external to or internal to at least one of the ECU 208 and the accelerator pedal position sensor 206 for access by the ECU 208, as needed.

If the real-time position AP lies between the idle position and the minimum accelerator pedal position $AP_{min}$, inclusive, then the load on the internal combustion engine 14, 314 may not be sufficient to take full advantage of the low range drive ratio. That is, the real-time position AP is not greater than the minimum accelerator pedal position $AP_{min}$ and the ECU 208 can then proceed to step S148.

If the ECU 208 moves from step S146 to step S148, then the ECU 208 can assign Auto Low with a value equal to zero (0). Then, the ECU can move step S150, where the ECU 208 can exit the Auto Low Set subroutine and return to step S126 of the main subroutine represented by FIG. 4. The ECU 208 can then proceed with the steps subsequent to step S126 of the main subroutine, as described above with reference to FIG. 4.

If the real-time position AP is greater than the minimum accelerator pedal position $AP_{min}$, then the load on the internal combustion engine 14, 314 may be sufficient to take advantage of the utility of the low range drive ratio. Accordingly, the ECU 208 can proceed to step S152 of the Auto Low Set subroutine.

At step S152, the ECU 208 can compare the real-time vehicle acceleration dtV with a maximum vehicle acceleration $dtV_{max}$. The maximum acceleration $dtV_{max}$ can be independent of the minimum accelerator pedal position $AP_{min}$ or the maximum acceleration $dtV_{max}$ can correspond to the minimum accelerator pedal position $AP_{min}$. This comparison can be useful to determine if the engine load suggested by the accelerator pedal position sensor 206 would benefit from the low range drive ratio. That is, if the real-time vehicle acceleration dtV is less than the maximum vehicle acceleration $dtV_{max}$ despite a real-time accelerator pedal position AP indicative of a high torque/power output for the internal combustion engine 14, 314, then the low range drive ratio may be advantageous for the vehicle 10, 310.

The real-time vehicle acceleration dtV can be provided by an acceleration sensor (not shown) in electrical communication with the ECU 208. The acceleration sensor can assign the value of the real-time vehicle acceleration dtV and can send the real-time vehicle acceleration dtV to the ECU 208. That is, the acceleration sensor can be configured with hardware and/or software to assign a value to the real-time vehicle acceleration dtV based on data sensed by the acceleration sensor. Alternatively, the acceleration sensor can provide raw data to the ECU 208 and the ECU 208 can be configured with hardware and/or software to process the raw data from the acceleration sensor and assign the appropriate value to the real-time vehicle acceleration dtV based on this processing. Also, the acceleration sensor can send the position data to the ECU 208 without a prompt by the ECU 208 and the data can be stored in an electronic memory component internal to or external to the ECU 208 until the ECU 208 reaches step S114. Alternatively, the acceleration sensor can send the data only when prompted by the ECU 208. And, the value for the real-time vehicle acceleration dtV can be stored in an electronic memory component external to or internal to at least one of the acceleration sensor and the ECU 208 for access by the ECU 208, as needed.

Alternatively, the real-time vehicle acceleration dtV can be calculated from sequential values of the real-time vehicle speed V. Either the vehicle speed sensor 204 or the ECU 208 can be configured with hardware and/or software to calculate the real-time vehicle acceleration dtV from the sequential values of the real-time vehicle speed V. The sequential values of the real-time vehicle speed can be stored in an electronic memory component external to or internal to either the vehicle speed sensor 204 or the ECU 208 for access by the appropriate one of the vehicle speed sensor 204 and the ECU 208, as needed.

The value of the maximum vehicle acceleration $dtV_{max}$ can be stored in an electronic memory component external to or internal to at least one of the acceleration sensor, the vehicle speed sensor 204, and the ECU 208 for access, as needed.

If the ECU 208 determines at step S152 that the real-time vehicle acceleration not less than the maximum acceleration $dtV_{max}$, then the ECU 208 can proceed to step S148 where the ECU 208 can assign Auto Low with a value that can be equal to zero (0). Thus, the actual vehicle performance substantially corresponds to an expected performance and the high range drive ratio can provide the most advantageous drivetrain performance with respect to power output and fuel consumption. Then the ECU 208 can continue as discussed above.

If at step S152 the ECU 208 determines that the real-time vehicle acceleration dtV is less than the maximum acceleration $dtV_{max}$, the ECU 208 can proceed to step S154.

At step S154, the ECU 208 can compare the data representing the real-time vehicle speed V provided by the vehicle speed sensor 204 with the maximum vehicle speed $V_{max}$, as discussed above with respect to step S136.

If the real-time vehicle speed V is not less than the maximum vehicle speed $V_{max}$, then advantage(s) offered by the low range drive ratio may be diminished. Accordingly, the ECU 208 can proceed to steps S148 and S150, where the ECU 208 can proceed as discussed above.

If the ECU 208 determines at step S154 that the real-time vehicle speed V is less than the maximum vehicle speed $V_{max}$, then the vehicle may be travelling at a speed for where an automatic shift to the low range drive ratio may be advantageous for the vehicle 10. The ECU 208 can then proceed to step S156 where the ECU 208 can assign Auto Low with a value that can be equal to one (1).

Then, the ECU 208 can proceed to step S150, as discussed above.

Thus, the flowchart of FIG. 5 has been described under various conditions where the ECU 208 enters step S140 with Auto Low having a value not equal to one (1). That, the actuator 202 is not in the low range position when the ECU 208 begins the Auto Low Set subroutine.

Next, execution of an algorithm represented by the flowchart of FIG. 5 will be described, where the actuator 202 is in the low range position when the ECU 208 begins the Auto Low Set subroutine. In this example, the value of Auto Low can be equal to one (1) and the ECU 208 will move from step S142 to step S144.

At step S144, the ECU 208 will begin another subroutine (Auto Low Cancel Check subroutine) where the ECU 208 will first determine if the actuator 202 should be move from the low range position to the high range position. In this subroutine, the ECU 208 can assign Auto Low Cancel a value that can be equal to zero (0) or one (1). A value of zero (0) for Auto Low Cancel can represent a condition where further use of the low range drive ratio can be beneficial to the performance of the vehicle 10, 310. A value of one (1) for Auto Low Cancel can represent a condition where any advantage(s) offered by the low range drive ratio may be diminished with continued use of the low range drive ratio. The ECU 208 will return from the Auto Low Cancel Check subroutine and resume the Auto Low Set subroutine at step S144. Details of this subroutine will be discussed with respect to FIG. 6 below.

After resuming at step S144, the ECU 208 can then proceed to step S158. At step S158, the ECU 208 can compare the value of Auto Low Cancel with a predetermined value. In this exemplary embodiment, the predetermined value can be equal to one (1). If the ECU 208 determines that Auto Low Cancel is equal to one (1), then the ECU 208 can proceed to steps S148 and S150, as discussed above. If the ECU 208 determines that Auto Low Cancel is not equal to one (1), then the ECU 208 can proceed to steps S156 and S150, as discussed above.

Under certain conditions, it may be prudent for the ECU 208 to automatically cause a shift from the low range drive ratio to the high range drive ratio. For example, it may be beneficial to engage the high range drive ratio every instance just prior to turning off the engine ignition. By way of another example, it may be beneficial for the ECU to automatically shift from the low range drive ratio to the high range drive ratio when the vehicle reaches a traveling speed that is suggestive of normal traction conditions, such as, clear, dry pavement, level ground, etc. In contrast, an example where it may be prudent to maintain engagement of the low range drive ratio may be when the traction control system is active. Other exemplary scenarios where maintenance or cancellation of the low range drive ratio are possible and are apparent to those skilled in the art.

As previously mentioned, step S144 of the Auto Low Set subroutine can represent the Auto Low Cancel Check subroutine that can be used to determine if the current automatic engagement of the low range drive ratio should be maintained. The ECU 208 can begin the Auto Low Cancel Check subroutine at step S160.

The ECU 208 can move from step S160 to step S162, where the ECU can compare the value of the real-time position AP with a predetermined value. In this exemplary embodiment, the predetermined value can be zero (0). This value of the real-time position AP can represent a condition where the accelerator pedal (or the throttle valve) is in the idle position, as discussed above.

Step S162 can be used by the ECU 208 to determine whether to activate an accelerator pedal timer $T_{AP}$ or to reset the accelerator pedal timer $T_{AP}$. As will be discussed below, the accelerator pedal timer $T_{AP}$ can be used by the ECU 208 to cancel further use of the low range drive ratio and to cause an automatic shift to the high range driver ratio.

At ignition on or at ignition off, the value of the accelerator pedal timer $T_{AP}$ can be set by the ECU 208 at a predetermined value and stored in an electronic memory component external to or internal to the ECU 208 for access by the ECU 208, as needed. The predetermined value can represent a maximum time deemed appropriate by one skilled in the art. Thus, when the ECU 208 enters the Auto Low Check subroutine for the first time, the accelerator pedal timer $T_{AP}$ can be set at its predetermined value.

If the ECU 208 determines that the real-time position AP has a value not equal to zero (0), then the ECU 208 can move to step S164. At step S164, the ECU 208 can set the accelerator pedal timer $T_{AP}$ to be equal to the predetermined value.

If the ECU 208 determines that the real-time position AP has a value equal to zero (0), then the ECU 208 can proceed to step S164 where the ECU 208 can decrement (i.e., increment by a negative number) the current value of the accelerator pedal timer $T_{AP}$.

Other values can be used as the basis for the comparison of the value of AP step S162 with a corresponding change in the decisions "Yes" and "No". By way of example, the comparison at step S162 can be "AP>0?" with the decision leading to step S166 being "No" and the decision leading to step S164 being "Yes".

From either step S164 or step S166, the ECU 208 can proceed to step S168. At step S168, the ECU 208 can determine if the traction control system (TCS) is active. The ECU 208 can obtain real-time status data of the TCS from an electronic memory component external to or internal to the ECU 208, as needed. Alternatively, the ECU 208 can be connected to an ECU that manages the TCS, such as a dedicated TCS ECU or an ECU dedicated to engine management. The ECU 208 can be configured with hardware and/or software to further process the real-time TCS status data or the ECU 208 can obtain this data ready for use by the ECU 208 at step S168.

If the TCS is not active, then the ECU 208 can move to step S170. If the TCS is active, then the ECU 208 can skip to step S172.

At step S170, the ECU 208 can compare the real-time vehicle speed V to the maximum low range speed $V_{max,low}$. The maximum low range speed $V_{max,low}$ can be set a predetermined value deemed appropriate by one skilled in the art. In this exemplary embodiment, the maximum low range speed $V_{max,low}$ can be set at a value that can correspond to the maximum speed at which the low range drive ratio may be beneficial to performance of the vehicle 10, 310. Alternatively, the maximum low range speed $V_{max,low}$ can be equal to the maximum vehicle speed $V_{max}$ discussed above.

Step S170 can be used by the ECU 208 to determine whether to activate a vehicle speed timer $T_V$ or to reset the vehicle speed timer $T_V$. As will be discussed below the vehicle speed timer $T_V$ can be used by the ECU 208 to cancel further use of the low range drive ratio and to cause an automatic shift to the high range driver ratio.

At ignition on or at ignition off, the value of the vehicle speed timer $T_V$ can be set by the ECU 208 at a predetermined value and stored in an electronic memory component external to or internal to the ECU 208 for access by the ECU 208, as needed. The predetermined value can represent a maximum time deemed appropriate by one skilled in the art. Thus, when the ECU 208 enters the Auto Low Check subroutine for the first time, the vehicle speed timer $T_V$ can be set at its predetermined value.

If the ECU 208 determines that the real-time vehicle speed V is not greater than the maximum low range speed $V_{max,low}$, then the ECU 208 can proceed to step S172. At step S172, the ECU 208 can set the vehicle speed timer $T_V$ to be equal to the predetermined value.

If the ECU 208 determines that the real-time vehicle speed V is greater than the maximum low range speed $V_{max,low}$, then the ECU 208 can proceed to step S174 where the ECU 208 can decrement the current value of the vehicle speed timer $T_V$.

From either step S170 or step S174, the ECU 208 can proceed to step S176. At step S176, the ECU can determine if either of the timers $T_{AP}$, $T_V$ have time out. If either timer equals zero (0) then the ECU can proceed to step S178 where the ECU can assign a value to Auto Low Cancel that can be equal to one (1). If the ECU 208 determines that both timers are not equal to zero (0), then the ECU can proceed to step S180, where the ECU 208 can assign a value to Auto Low Cancel that can be equal to zero (0).

From either step S178 or step S180, the ECU 208 can proceed to step S182. At step S182, the ECU 208 can exit the Auto Low Cancel Check subroutine and resume the Auto Low Set subroutine at step S144, as discussed above.

Other parameters can be considered in the subroutines represented by FIGS. 4-6. Examples of these parameters can include any of, but are not limited to, engine output torque, engine intake air flow, fuel flow, transmission output torque, transmission output speed, transmission gear selection, input speed of the power-take-off assembly 32, output speed of the power-take-off assembly 32, status of torque distribution in the rear differential 22, position of an AWD manual switch, vehicle inclination angle, vehicle load distribution, brake pedal position, and trailer detection signals.

Thus, an algorithm in accordance with the disclosed subject matter and executed by the control system n accordance with the disclosed subject matter can provide automatic on-the-fly shifts between the low range drive ratio and the high range drive ratio. Such a control system can also permit the driver to override the automatic selection of the low and high range drive ratios and request engagement of the low range drive ratio. Such a control system 200 can also monitor the driver's request for manual engagement of the low range drive ratio.

While certain embodiments of the disclosed subject matter are described above, it should be understood that the disclosed subject matter can be embodied and configured in many different ways without departing from the spirit and scope of the disclosed subject matter.

While the method and control loop shown in FIGS. 2 and 4-6 are described with respect to certain steps S100-S114 and S120-S182, there could be many different and additional steps in various chronological order without departing from the scope of the presently disclosed subject matter.

Additionally, the values of Manual Low Sw, Current Range, Auto Low, and Auto Low Cancel could be compared to values different from either zero (0) or one (1). In accordance with these modification, the decision answers correspondingly can be changed from "Yes" to "No" and from "No" to "Yes" at steps S122, S124, S128, S142, S158.

In a another modification in accordance with the disclosed subject matter, the comparison base (i.e, Vmax, APmin, dtVmax) for any or all of the real-time vehicle speed V, the real-time accelerator position AP and the real-time vehicle acceleration dtV can be assigned different values with a corresponding change in the mathematical symbol representing the comparison and/or the decision answers (i.e., "Yes" and "No") at steps S146, S152, S154, and S170.

Also, the timers $T_V$, $T_{AP}$ can be incremented instead of decremented at steps S166 and S174. In this alternate embodiment, the timers $T_V$, $T_{AP}$ can be reset to a minimum value (or to a value equal to zero (0)). In a further modification, the timers $T_V$, $T_{AP}$ can be compared to a maximum timer value (for example, a value of thirty (30)) instead of to a value of zero (0) when the timers are either decremented or incremented, with a corresponding change in the values of "Yes" and "No" at the comparison decision step S176.

In another exemplary embodiment, the ECU 208 can be directly connected to the engine 14, 314 and the transmission 28, 328 via electrical communication lines. Alternatively, the ECU 208 can be connected to an ECU(s) for the engine 14, 314 and/or the transmission 28, 328 via electrical communication lines.

In yet another possible embodiment, the presently disclosed subject matter could be incorporated into a manual transmission, if desired. In such a case, the operator of the vehicle could realize the benefit of using a low or high gear ratio without making the decision to place (or manually placing) the vehicle into the low or high range ratio.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A method for automatically controlling a drivetrain coupled to at least one drive wheel of a vehicle, the drivetrain including a first assembly including a low range drive ratio and a high range drive ratio, and a second assembly including a reverse drive ratio and a plurality of forward drive ratios, the method comprising:
providing an electronic control unit configured to receive information from at least one sensor located on the vehicle and to provide an output signal based on the information;
providing an actuator mechanism configured to cause the first assembly to operate at a selected one of the low range drive ratio and the high range drive ratio;
automatically causing the actuator mechanism to select one of the low range drive ratio and the high range drive ratio regardless of a manipulation of one of the reverse drive ratio and the plurality of forward drive ratios and based on the output signal from the electronic control unit; and
driving the at least one drive wheel at the selected one of the low range drive ratio and the high range drive ratio and simultaneously with one of the reverse drive ratio and a ratio of the plurality of forward drive ratios.

2. The method according to claim 1, further comprising:
determining a plurality of vehicle operation parameters using the electronic control unit;
wherein automatically causing the actuator mechanism to select includes automatically causing the actuator mechanism to select one of the low range drive ratio and the high range drive ratio based on the plurality of vehicle parameters and through the use of the electronic control unit.

3. The method according to claim 2, wherein determining includes:
collecting data indicating at least one of vehicle speed, accelerator pedal position, and vehicle acceleration; and
comparing the data with a corresponding one of maximum speed, minimum position, and maximum acceleration.

4. The method according to claim 3, wherein determining further includes:
collecting switch data indicating a position of a manual shift control switch; and
comparing the switch data with a switch value.

5. The method according to claim 4, wherein automatically causing the actuator mechanism to select includes automatically causing the actuator mechanism to select the low range drive ratio when the switch data equals the switch value.

6. The method according to claim 4, wherein automatically causing the actuator mechanism to select includes:
automatically causing the actuator mechanism to select the low range drive ratio when:
the switch data is unequal to the switch value;
the vehicle speed is less than the maximum speed;
the accelerator position is greater than the minimum position; and
the vehicle acceleration is less than the maximum acceleration; and
automatically causing the actuator mechanism to select the high range drive ratio when:
the switch data is unequal to the switch value and at least one of:
the vehicle speed is at least equal to the maximum speed;
the accelerator position is at most equal to the minimum position; and
the vehicle acceleration is at least equal to the maximum acceleration.

7. The method according to claim 3, wherein automatically causing the actuator mechanism to select includes:
automatically causing the actuator mechanism to select the low range drive ratio when,
the vehicle speed is less than the maximum speed,
the accelerator position is greater than the minimum position, and
the vehicle acceleration is less than the maximum acceleration.

8. The method according to claim 3, wherein automatically causing the actuator mechanism to select includes:
automatically causing the actuator mechanism to select the high range drive ratio when at least one of,
the vehicle speed is at least equal to the maximum speed,
the accelerator position is at most equal to the minimum position, and
the vehicle acceleration is at least equal to the maximum acceleration.

9. The method according to claim 2, wherein:
determining further includes:
collecting switch data indicating a position of a manual shift control switch; and
comparing the switch data with a switch value;
determining whether a last recommended position for the actuator mechanism is equal to a low range position when the switch data is unequal to the switch value;
generating one of a cancel signal and a continue signal when the last recommended position is equal to the low range position;
collecting data indicating at least one of an accelerator pedal position, a vehicle acceleration, and a vehicle speed;
comparing the data with a corresponding one of a minimum position, a maximum acceleration, and a maximum speed when the last recommended position is unequal to the low range position;
automatically causing the actuator mechanism to select includes:
automatically causing the actuator mechanism to select the low range drive ratio when:
the vehicle speed is less than the maximum speed;
the accelerator position is greater than the minimum position; and
the vehicle acceleration is less than the maximum acceleration;
automatically causing the actuator mechanism to select the low range drive ratio when the continue signal is generated; and
automatically causing the actuator mechanism to select the high range drive ratio when at least one of:
the vehicle speed is at least equal to the maximum speed;
the accelerator position is at most equal to the minimum position; and
the vehicle acceleration is at least equal to the maximum acceleration; and
the cancel signal is generated.

10. The method according to claim 9, wherein generating includes:
comparing the accelerator pedal position to second position;
comparing the vehicle speed to a second speed;
setting a timer to an initial value if one of the accelerator pedal position is unequal to the second position and the vehicle speed is at most equal to the second speed;

incrementing the timer if one of accelerator pedal position equals the second position and the vehicle speed is less than the second speed;

comparing the timer to a cancel value;

generating the cancel signal when the timer equals the cancel value; and generating the continue signal when the timer is unequal to the cancel value.

11. The method according to claim 2, wherein automatically causing includes automatically causing the actuator mechanism to select the low range drive ratio when at least one of the vehicle speed is less than the maximum speed, the accelerator position is greater than the minimum position, and the vehicle acceleration is less than the maximum acceleration.

12. The method according to claim 1, wherein automatically causing includes:

providing a switch that includes an automatic switch position and a manual switch position;

causing the actuator mechanism to place the first assembly in the low range drive ratio when the switch position is in the manual position;

comparing a vehicle speed with a maximum speed when the switch position is in the automatic switch position;

comparing an accelerator pedal position to a minimum position when the vehicle speed is less than the maximum speed;

comparing the vehicle acceleration to a maximum acceleration when the accelerator pedal position is greater than the minimum position;

causing the actuator mechanism to place the first assembly in the low range drive ratio when the vehicle acceleration is less than the maximum acceleration; and causing the actuator mechanism to place the first assembly in the high range drive ratio when the switch position is not in the manual position and when one of the vehicle speed is at least equal to the maximum speed, the accelerator pedal position is at most equal to the minimum position, and the vehicle acceleration is at least equal to the maximum acceleration.

13. A method for automatically controlling a drivetrain coupled to at least one drive wheel of a vehicle, the drivetrain including a first assembly including a low range drive ratio and a high range drive ratio, and a second assembly including a reverse drive ratio and a plurality of forward drive ratios, the method comprising:

providing an electronic control unit configured to receive information from at least one sensor located on the vehicle and to provide an output signal based on the information;

providing an actuator mechanism configured to cause the first assembly to operate at a selected one of the low range drive ratio and the high range drive ratio;

automatically causing the actuator mechanism to select one of the low range drive ratio and the high range drive ratio independently of a selection of one of the reverse drive ratio and the plurality of forward drive ratios and based on the output signal from the electronic control unit;

driving the at least one drive wheel at the selected one of the low range drive ratio and the high range drive ratio and simultaneously with one of the reverse drive ratio and a ratio of the plurality of forward drive ratios; and determining a plurality of vehicle operation parameters using the electronic control unit; wherein:

automatically causing the actuator mechanism to select one of the low range drive ratio and the high range drive ratio based on the plurality of vehicle parameters and through the use of the electronic control unit;

determining includes:

collecting data indicating at least one of vehicle speed, accelerator pedal position, and vehicle acceleration;

comparing the data with a corresponding one of maximum speed, minimum position, and maximum acceleration;

collecting switch data indicating a position of a manual shift control switch;

comparing the switch data with a switch value;

collecting actuator data indicating a position of the actuator mechanism; and comparing the actuator data to a high range position when the switch data equals the switch value; and automatically causing the actuator mechanism to select includes causing the actuator to select the low range drive ratio when the actuator data is unequal the high range position.

14. The method according to claim 13, wherein:

determining further includes comparing the vehicle speed with the maximum speed when the actuator data equals the high range position; and automatically causing the actuator mechanism to select includes:

after comparing the vehicle speed when the actuator data equals the high range position, causing the actuator to select the low range drive ratio when the vehicle speed is less than the maximum speed; and after comparing the vehicle speed when the actuator data equals the high range position value, causing the actuator to select the high range drive ratio when the vehicle speed is at least equal to the maximum speed.

15. A system for automatically controlling a two-speed gear reduction assembly in series with a multi-ratio transmission assembly of a vehicle, the two-speed gear reduction assembly including a low range drive ratio and a high range drive ratio, and the multi-ratio transmission assembly including a reverse drive ratio and a plurality of forward drive ratios, the system comprising:

an actuator selectively movable between a low range position where the actuator couples the low range drive ratio in series with one of the reverse drive ratio and the plurality of forward drive ratios and a high range position where the actuator couples the high range drive ratio in series with the selected one of the reverse drive ratio and the plurality of forward drive ratios;

a vehicle speed sensor;

a vehicle acceleration sensor; and a controller in electrical communication with each of the actuator, the vehicle speed sensor and the vehicle acceleration sensor and configured to automatically select one of the low range drive ratio and the high range drive ratio regardless of a manipulation of one of the reverse drive ratio and the plurality of forward drive ratios and based on electrical signals received from the vehicle speed sensor and the vehicle acceleration sensor, and automatically signal the actuator to move to a respective one of the low range position and the high range position when one of the low range drive ratio and the high range drive ratio is automatically selected.

16. The system according to claim 15, wherein the controller is further configured to
   determine a plurality of vehicle operation parameters, and
   automatically select the one of a low range drive ratio and the high range drive ratio based on the plurality of vehicle parameters.

17. The system according to claim 16, wherein:
   the vehicle parameters include at least one of a vehicle speed, an accelerator position, and a vehicle acceleration; and
   the controller is configured to compare the vehicle speed, the accelerator position, and the vehicle acceleration with a corresponding one of a maximum speed, a minimum position, and a maximum acceleration.

18. The system according to claim 17, wherein:
   the vehicle parameters include switch data indicating a position of a manual shift control switch; and
   the controller is configured to compare the switch data with a switch value and to automatically select the low range drive ratio when the switch data equals the switch value.

19. The system according to claim 18, wherein:
   the controller is configured to automatically select the low range drive ratio when:
      the switch data is unequal to the switch value;
      the vehicle speed is less than the maximum speed;
      the accelerator position is greater than the minimum position; and
      the vehicle acceleration is less than the maximum acceleration; and
   the controller is configured to automatically select the high range drive ratio when:
      the switch data is unequal to the switch value; and
      at least one of the vehicle speed is at least equal to the maximum speed;
      the accelerator position is at most equal to the minimum position; and
      the vehicle acceleration is at least equal to the maximum acceleration.

20. The system according to claim 17, wherein the controller is configured to automatically select the low range drive gear ratio when:
   the vehicle speed is less than the maximum speed;
   the accelerator position is greater than the minimum position; and
   the vehicle acceleration is less than the maximum acceleration.

21. The system according to claim 17, wherein the controller is configured to automatically select the high range drive ratio when at least one of:
   the vehicle speed is at least equal to the maximum speed;
   the accelerator position is at most equal to the minimum position; and
   the vehicle acceleration is at least equal to the maximum acceleration.

22. A method for automatically controlling a drivetrain assembly driving at least one wheel of a vehicle, the drivetrain including a two-speed gear reduction assembly in series with a multi-ratio transmission assembly, the two-speed drive assembly including a low range drive ratio and a high range drive ratio, and the multi-ratio transmission assembly including a reverse drive ratio and a plurality of forward drive ratios, the method comprising:
   providing a switch that can be manually shifted from an automatic position to a manual position;
   determining a position of the switch;
   causing the drivetrain to operate in the low range drive ratio when the position of the switch equals the manual position;
   comparing a vehicle speed with a maximum vehicle speed when the position of the switch is equal to the automatic position;
   comparing an accelerator pedal position to a minimum position when the vehicle speed is less than the maximum speed;
   comparing a vehicle acceleration to a maximum acceleration when the accelerator pedal position is greater than the minimum position;
   causing the drivetrain to operate in the low range drive ratio when the vehicle acceleration is less than the maximum acceleration;
   causing the drivetrain to operate in the high range drive ratio when the position of the switch is equal to the automatic position and when one of the vehicle speed is at least equal to the maximum speed, the accelerator pedal position is at most equal to the minimum position, and the vehicle acceleration is at least equal to the maximum acceleration; and
   driving the at least one wheel at the selected one of the low range drive ratio and the high range drive ratio and with one of the reverse drive ratio and the plurality of forward drive ratios.

23. The method according to claim 22, wherein causing the drivetrain to operate in the low range drive ratio when the position of the switch equals the manual position includes:
   collecting data indicating a current drive position; and
   comparing the current drive position to a high range position when the switch position equals the manual position; and
   causing the drivetrain to operate in the low range drive ratio when the current drive position is unequal to the high range position.

24. The method according to claim 23, wherein causing the drivetrain to operate in the low range drive ratio when the position of the switch equals the manual position further includes:
   comparing the vehicle speed with the maximum speed when the current drive position equals the high range position; and
   after comparing the vehicle speed when the current drive position equals the high range position, causing the drivetrain to operate in the low range drive ratio when the vehicle speed is less than the maximum speed.

25. The method according to claim 22, further comprising:
   collecting data indicating a current drive position; and
   comparing the current drive position to a high range position when the switch position equals the manual position; and
   comparing the vehicle speed with the maximum speed when the current drive position equals the high range position; and
   causing the drivetrain to operate in the high range drive ratio when the vehicle speed is at least equal to the maximum speed.

26. The method according to claim 22, further comprising:
   before comparing a vehicle speed, determining whether a current drive ratio is equal to the low range drive ratio when the switch position equals the automatic position;
   generating one of a cancel signal and a continue signal when the current drive ratio equals the low range drive ratio;

collecting data indicating at least one of an accelerator pedal position, a vehicle acceleration, and a vehicle speed;

comparing the data with a corresponding one of a minimum position, a maximum acceleration, and a maximum speed when the current drive ratio is unequal to the low range drive ratio; and wherein the causing the drivetrain to operate in the low range drive ratio includes causing the drivetrain to operate in the low range drive ratio when the continue signal is generated; and wherein the causing the drivetrain to operate in the high range drive ratio includes causing the drivetrain to operate in the high range drive ratio when at least one of:
the vehicle speed is at least equal to the maximum speed;
the accelerator position is at most equal to the minimum position; and
the vehicle acceleration is at least equal to the maximum acceleration; and
the cancel signal is generated.

27. The method according to claim 26, wherein generating includes:
comparing the accelerator pedal position to second position;
comparing the vehicle speed to a second speed;
setting a timer to an initial value if one of the accelerator pedal position is unequal to the second position and the vehicle speed is at most equal to the second speed;
incrementing the timer if one of accelerator pedal position equals the second position and the vehicle speed is less than the second speed;
comparing the timer to a cancel value;
generating the cancel signal when the timer equals the cancel value; and
generating the continue signal when the timer is unequal to the cancel value.

28. The method according to claim 22, further comprising:
determining whether the multi-ratio transmission assembly is operating in the reverse drive ratio or a lowest of the plurality of forward drive ratios; and
causing the drivetrain to operate in the low range drive ratio only when the multi-ratio transmission assembly is operating in the reverse drive ratio or a lowest of the plurality of forward drive ratios.

29. A drivetrain for a vehicle comprising:
a multi-ratio transmission assembly including a reverse drive ratio and a plurality of forward drive ratios;
a two-speed drive assembly including,
a low range drive ratio engageable in series with one of the reverse drive ratio and the plurality of forward drive ratios, and
a high range drive ratio engageable in series with one of the reverse drive ratio and the plurality of forward drive ratios;
an actuator selectively movable between a low range position where the actuator couples the low range drive ratio in series with a selected one of the reverse drive ratio and the plurality of forward drive ratios and a high range position where the actuator couples the high range drive ratio in series with the selected one of the reverse drive ratio and the plurality of forward drive ratios;
a vehicle speed sensor;
a vehicle acceleration sensor;
a controller in electrical communication with each of the actuator, the vehicle speed sensor and the vehicle acceleration sensor, and configured to
automatically select one of the low range drive ratio and the high range drive ratio regardless of a manipulation of one of the reverse drive ratio and the plurality of forward drive ratios and based on electrical signals received from the vehicle speed sensor and the vehicle acceleration sensor, and
automatically signal the actuator to move to a respective one of the low range position and the high range position when one of the low range drive ratio and the high range drive ratio is automatically selected; and
at least one drive wheel driven by each of one of the reverse drive ratio and the plurality of forward drive ratios and the selected one of the low range drive ratio and the high range drive ratio.

30. The drivetrain according to claim 29, further comprising:
a housing, wherein the transmission assembly and the two-speed drive assembly are mounted within the housing, and the housing has a longitudinal axis that extends substantially parallel with a transverse axis of the vehicle.

31. The drivetrain according to claim 29, further comprising:
a housing, wherein the transmission assembly and the two-speed drive assembly are mounted within the housing, and the housing has a longitudinal axis that extends substantially parallel with a longitudinal axis of the vehicle.

32. The drivetrain according to claim 29, wherein the transmission assembly includes one of a manually selected multi-ratio transmission, an automatically selected multi-ratio transmission, and a continuously variable multi-ratio transmission.

* * * * *